Sept. 8, 1970   A. A. SPANJERSBERG   3,528,059
READING DEVICE HAVING TOLERANCE LIMITS
Original Filed Feb. 20, 1964   4 Sheets-Sheet 1

INVENTOR.
A. A. SPANJERSBERG
BY
ATTORNEY

INVENTOR.
A. A. SPANJERSBERG
ATTORNEY

# United States Patent Office 3,528,059
Patented Sept. 8, 1970

3,528,059
READING DEVICE HAVING TOLERANCE LIMITS
Arie Adriaan Spanjersberg, Leiderdorp, Netherlands, assignor to De Staat der Nederlanden, Ten Deze Vertegenwoordigd Door de Directeur-Generaal der Posterijen, Telegrafie en Telefonie, The Hague, Netherlands
Continuation of application Ser. No. 346,292, Feb. 20, 1964. This application Sept. 26, 1968, Ser. No. 784,272
Claims priority, application Netherlands, Feb. 21, 1963, 289,310
Int. Cl. G06k 7/10, 9/06
U.S. Cl. 340—146.3                                12 Claims

ABSTRACT OF THE DISCLOSURE

A photoelectric reading device for a registration bearer with at least one column of marking-areas or squares to be filled-in by unskilled persons and adjacent thereto a column of position marks corresponding to said areas, said device containing a photocell for each column for generating pulses in response to each mark, and pulse shaping circuits or networks controlled by said pulses generated from said photocells, so that a correct response may be had from marks for the areas even within predetermined limits before and through said areas.

---

This is a continuation of application Ser. No. 346,292, filed Feb. 20, 1964, now abandoned.

RELATED APPLICATIONS

Netherlands patent application Ser. No. 289,310 filed Feb. 21, 1963, from which the present application claims priority.

BACKGROUND OF INVENTION

A prior reading device is described in a brochure published in 1961 by Remington Rand Univac entitled "Optical Scanning Punch Types 5320, 5330, 5340" in which a registration bearer is scanned for the presence of marks in marking-squares. This reading-device has the disadvantage that the presence of such marks are only established correctly, if the marks do not extend beyond the limits of the marking squares and also fill the upper part of the marking squares. Marks that do not fufill these conditions, but indicate unambiguously a marking-position, are not correctly handled (see p. 4 of the above-mentioned brochure). Persons specially appointed for filling up the forms can be instructed in correctly placing the marks. If, however, the marks are to be placed by a random public, as e.g. is the case with postal clearing forms, many marks will not be correctly read by this and other known reading-devices, because they do not satisfy the necessary tolerance demands.

SUMMARY OF INVENTION

Accordingly it is an object of this invention to provide a reading-device which correctly reads all marks unambiguously indicating a marking-position in and/or adjacent to marking areas on information bearers.

According to this invention, this object has been achieved by having beside the columns of marking areas or squares, a column of position or synchronization marks which aid in establishing imaginary upper and lower tolerance lines or limits for each marking area. Herein, for example, the upper imaginary tolerance line is timed to be about half way between the lower and upper limits of adjacent marking areas or squares and the lower tolerance line is timed to be at the lower limit of each marking area scanned. Thus, when those columns of marking areas and position marks are scanned from top to bottom, unambiguous marks for the marking areas can be correctly read by the reading device of this invention, provided the upper limits of these marks occur between the established upper and lower imaginary tolerance lines or limits for each marking area.

This reading-device contains photocells for each column of marking-areas or squares as well as an additional photocell provided for scanning the position marks. This additional photocell is connected to a first pulse-shaping network having a certain time constant allowing of an extension of a pulse applied to it up to the moment when the other photocells across the lower tolerance line of their corresponding marking areas or squares. Each of the other marking-area-scanning photocells is connected to a second pulse shaping network, the output terminals of which second networks are connected together with the output terminal of the first pulse shaping network via separate AND-gates. The output terminal of each such AND-gate is connected to a detecting circuit capable of storing the marking position in the relevant column.

In the case that the position marks are so located with respect to the marking areas or squares that the additional scanning photocell crosses the upper limit of the position marks earlier or before the other or marking-area-scanning photocells cross the upper imaginary tolerance line of the corresponding marking area or square, a delay network should be introduced in the first pulse shaping network in order to properly locate the upper tolerance line.

On the other hand, in the case that the position marks are so located with respect to the marking areas or squares that the additional scanning photocell does not cross the upper limit of the position marks earlier or before the other or marking-area-scanning photocells cross the upper imaginary tolerance line of the corresponding marking area, a trigger is inserted between each second pulse shaping network and its corresponding AND-gate to store and await the position pulse from the first pulse shaping network. The other input terminal of this trigger is connected to the output terminal of a third pulse-shaping network having a certain time constant to produce of a pulse for resetting this trigger. The time duration of this pulse is the time for scanning the distance between the crossing of the lower tolerance line of a marking-area or square and the upper tolerance line of the next marking-area or square, which corresponds to half way between the two marking areas. Thus, this third pulse shaping network is controlled by and is connected to the output terminal of the first pulse-shaping network.

Each pulse shaping network has a differentiating circuit, and each AND-gate for each column of marking areas or squares has a pulse detecting circuit. This pulse detecting circuit may comprise a self-resetting counter connected to the first pulse shaping network and a group of AND-gates connected to triggers for storing the marked marking areas. These marked areas are determined from the output of the AND-gate for each column, which output is connected to each of the group of AND-gates from the counter for that column. Accordingly the output of the reading device of this invention may be taken from these storing triggers in the detecting circuits for each column of marking areas or squares on the information or registration bearer.

BRIEF DESCRIPTION OF THE VIEWS

The above mentioned and other features, objects, and advantages and a manner of obtaining them are described more specifically below by reference to two embodiments of this invention shown in the accompanying drawings, wherein.

Figure 1:
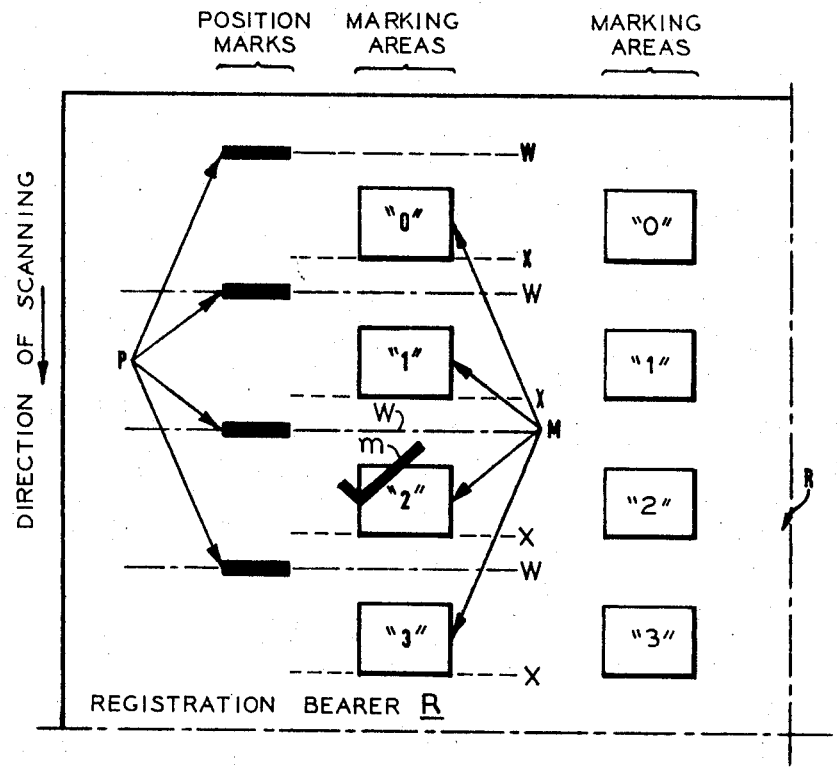
FIG. 1 shows a part of a registration bearer with columns of marking-areas or squares and position marks according to one or a first embodiment of this invention with marking area 2 in the first column of marking areas being marked.
Figure 2:
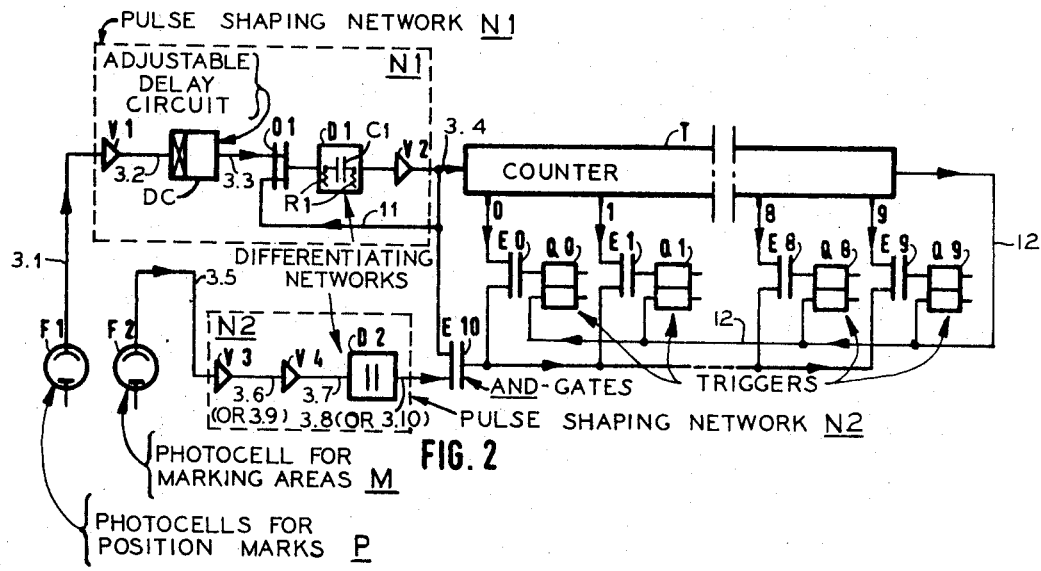
FIG. 2 is a schematic block wiring diagram of an embodiment of a reading-device for the registration bearer shown in FIG. 1.
Figure 3:
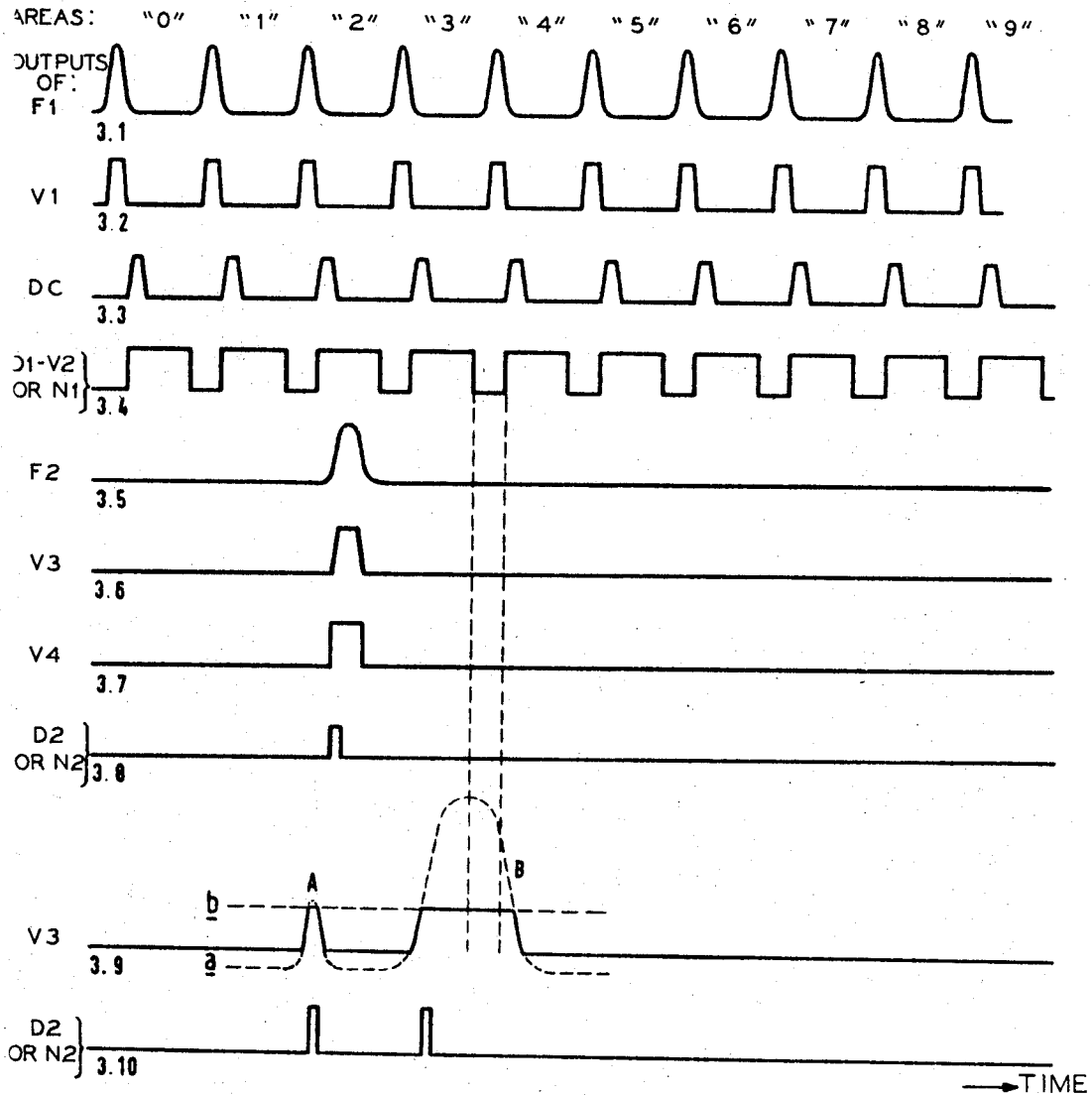
FIG. 3 represents a plurality of wave forms of the pulses according to time appearing at various points of the circuit of the reading device shown in FIG. 2.

DETAILED DESCRIPTION OF PREFERRED EMBODIMENTS (A) First embodiment (FIGS. 1, 2 and 3)

(1) *Information bearer*—FIG. 1 shows a part of the registration or information bearer R with a column of synchronization or position marks P adjacent a column of marking squares or areas M. The centre lines of the position marks P are in line with the centre lines of the intervals between two successive marking-squares M (indicated by the dot and dash lines W), the upper position mark occupying a corresponding position with respect to the upper marking-square. The dash lines X and the dot and dash lines W do not actually occur on the registration bearer, but indicate the imaginary upper and lower tolerance lines between which the upper limit of a mark placed in the marking-square must be located, if it is to be associated unambiguously with that marking-square and if it is to be handled correctly in the reading-device.

The registration bearer R is read from top to bottom in the direction of the columns, the position marks P being scanned notably by a photocell F1 (see FIG. 2) and the marking-squares M by a photocell F2. These photocells are assumed to be in one horizontal line.

(2) *Reading device (FIG. 2)*—FIG. 2 is a schematic block wiring diagram of the circuit for a scanning or reading device for the marks P and M on the bearer shown in FIG. 2. In addition to the photocells F1 and F2 there are four amplifiers, V1 through V4, delay circuit DC, an OR-gate 01, two differentiating circuits D1 and D2, eleven AND-gates E0 through E10, a counter T, and ten triggers Q0 through Q9.

(3) *Operation*—(a) Position pulse shaping circuit N1.

In FIG. 3 wave form 3.1 shows the pulses appearing at the output terminal of the photocell F1 as a function of time. (The corresponding output conductors in the wiring diagrams are also identified by the reference characters of the wave forms.) It is assumed that there are ten position marks and ten marking-squares per column on the registration bearer R. The pulse series delivered by the photocell F1 is applied to the input terminal of the amplifier V1, the final stage of which is arranged as a limiter. Wave form 3.2 shows the pulses appearing at the output terminal of this amplifier as a function of time. The moment when the leading edge of a pulse appears, is determined by the location and the dimensions of the photosensitive area and by the properties of the photocell F1 and the amplifier V1. In order that the leading edge of such a pulse appears at the moment when the photocell F2 crosses the imaginary tolerance line W, the pulse is applied to the delay circuit DC, which passes it on with a delay depending e.g. on an adjustable time constant of this delay circuit DC. The series of pulses appearing at the output terminal of the delay circuit DC is shown in wave form 3.3. This series is applied to the input terminal of the OR-gate 01, the output terminal of which is connected to the input terminal of the differentiating circuit D1. The output terminal of this circuit D1 is connected to the input terminal of amplifier V2, the output terminal of which is connected to a second input terminal of the OR-gate 01 via conductor 11. This whole circuit works as a pulse-shaping network N1, the duration of the pulses appearing at the output terminal of the amplifier V2 being determined by the time constant of the differentiating circuit D1. This latter circuit D1 consists of a capacitor C1, both plates of which are connected via resistors R1 to points of fixed potential which capacitor C1 and/or resistors R1 may be pre-set or adjustable. Thus the duration is so adjusted that the pulse ends at the moment when the photocell F2 crosses the imaginary tolerance line X. The series of pulses appearing at the output terminal of the amplifier V2 on this network N1 is shown as a function of time in wave form 3.4. This series of pulses 3.4 is applied to the counter T which has ten output terminals 0 and 1 through 9. At the beginning of the scanning this counter T is in the normal state and it returns itself to that state at the end of the scanning, when the photocell F1 has scanned ten position marks.

(A–3)–(b) Marking pulse shaping circuit N2

Now the delivery of pulses by the photocell F2 will be described. Wave form 3.5 in FIG. 3 shows as a function of time what appears at the output terminal of this photocell F2 in the case of a mark *m* occurring in and adjacent the marking-square or area 2. This pulse from the mark *m* in area M2 is applied to the amplifier V3, the final stage of which is arranged as a limiter. The pulse appearing at the output terminal of this amplifier V3 is shown in wave form 3.6. Its steepness of rise is determined by the properties of the photocell F2 and the amplifier V3, by the optical contrast between the mark and its background, and by the shape of the mark *m* placed in this area or square M2. The moment when the leading edge appears depends on the position of the mark *m*. In order to increase the steepness of rise and to make it more constant, the output pulse of the amplifier V3 is applied to another amplifier V4. The pulse appearing at the output terminal of this amplifier V4 is shown in wave form 37. This pulse in wave form 3.7 is applied to the differentiating circuit D2 so that the pulse shown in wave form 3.8 is obtained. Thus, the pulse produced from scanning the marks *m* are shaped in this second pulse shaping network N2 to produce the pulses shown in the wave form 3.8 in FIG. 3.

(A–3)–(c) Detecting circuit

The output terminal of the differentiating circuit D2 or pulse shaping network N2 and that of the amplifier V2 or pulse shaping network D1 are connected to the AND gate E10. Consequently, there will only appear a pulse at the output terminal of this AND-gate E10, if the photocell F2 observes the beginning of a mark between the imaginary tolerance lines W and X of a marking-area or square. The output terminal of the AND-gate E10 is connected to a first input terminal of each of the AND-gates E0 through E9. A second input terminal of these AND-gates is connected to the respective output terminals 0 through 9 of the counter T. The output terminal of each of these AND-gates E0 through E9 is connected to a separate storing or bistable trigger Q0 through Q9 from which the outputs of the reading device of this invention are taken. In the described case of a mark being observed in the marking-square "2" a pulse will appear at the output terminal of the AND-gate E2 (not shown) to change over the trigger Q2 (not shown). If one of the other marking squares or areas is marked, the corresponding trigger Q0, Q1, or Q3 through Q9 will be changed over in an analogous way during the scanning. At the end of the scanning of a column of position marks the triggers Q0 through Q9, as far as necessary, can be restored to normal by a signal derived from the counter T via conductor 12.

Several columns of marking-squares M can be associated with one column of position-marks P. It will be clear that in that case the reading-device must be provided with a photocell such as F2, amplifiers such as V3, V4, a differentiating circuit such as D2, AND-gates such as E0 through E10, and triggers such as Q0 through Q9 for each of these columns.

Wave form 3.9 and 3.10 illustrate the necessity of the presence of the pulse shaping network N2 and its differentiating circuit D2. The fact is that a mark presenting a great contrast to its background and entirely filling the marking-area or square M causes a pulse of a longer duration to appear at the output terminal of the amplifier V3. In wave form 3.9 of FIG. 3 a pulse of a short duration is shown at point A, a pulse having a longer duration being represented at B. The horizontal lines $a$ and $b$ indicate the limiting-levels in the amplifier V3. A comparison of the wave forms 3.9 and 3.4 teaches that the position of the mark cannot be determined without further measures being taken to reshape the pulse at point B, since there is coincidence with two of the pulses of wave form 3.4. By means of the pulses derived in the differentiating circuit D2 (see wave form 3.10) from the A and B pulses, the desired position can be correctly determined. Thus any mark, filled-in in such a way that its upper limit lies between the imaginary tolerance lines W and X, can be properly detected.

If the mark has the shape of a cross, the photocell F2 may deliver two pulses, when scanning it. These pulses, however, will appear with the same state of the counter T, because only one position mark P corresponds to each marking-square, and so only one trigger Q will be changed over.

(B) SECOND EMBODIMENT (FIGS. 4, 5 AND 6)

Figure 4:
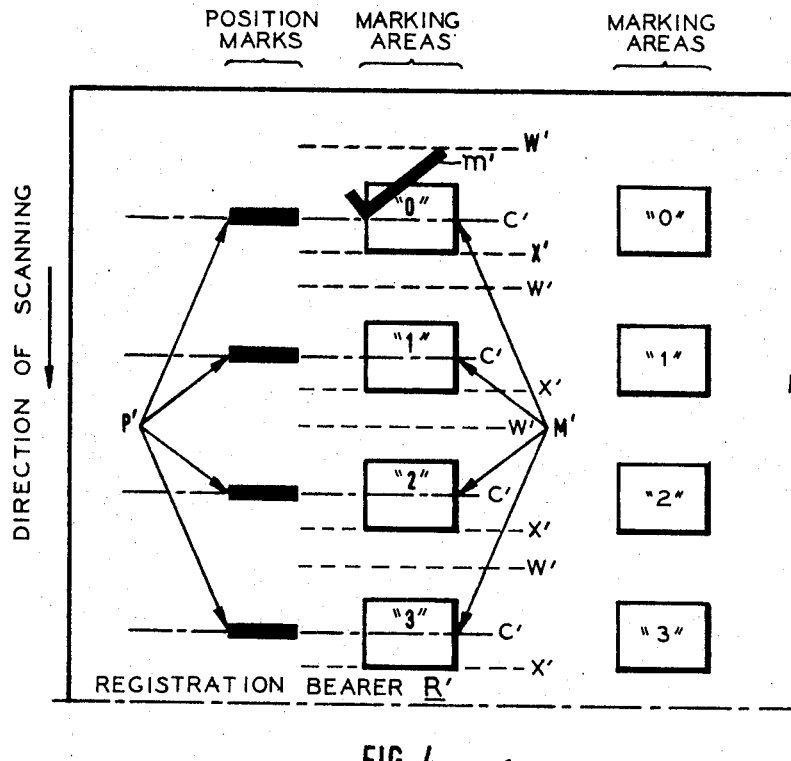
FIG. 4 shows a part of a registration bearer with columns of marking-areas or squares and position marks according to another or second embodiment of this invention with marking area 0 in the first column of marking areas being marked.

(1) Information bearer (FIG. 4)

FIG. 4 shows part of an information or registration bearer R' having position marks P' whose center lines $c'$ are in line with the centre lines of the marking-areas or squares M'.

The lines W' and X' are again imaginary tolerance lines for the upper marking-area or square. If in this case too, the position marks P' and the marking-square M' are to be scanned by photocells F1' and F2' placed in one horizontal line, the scanning or reading device must be altered.

Figure 5:
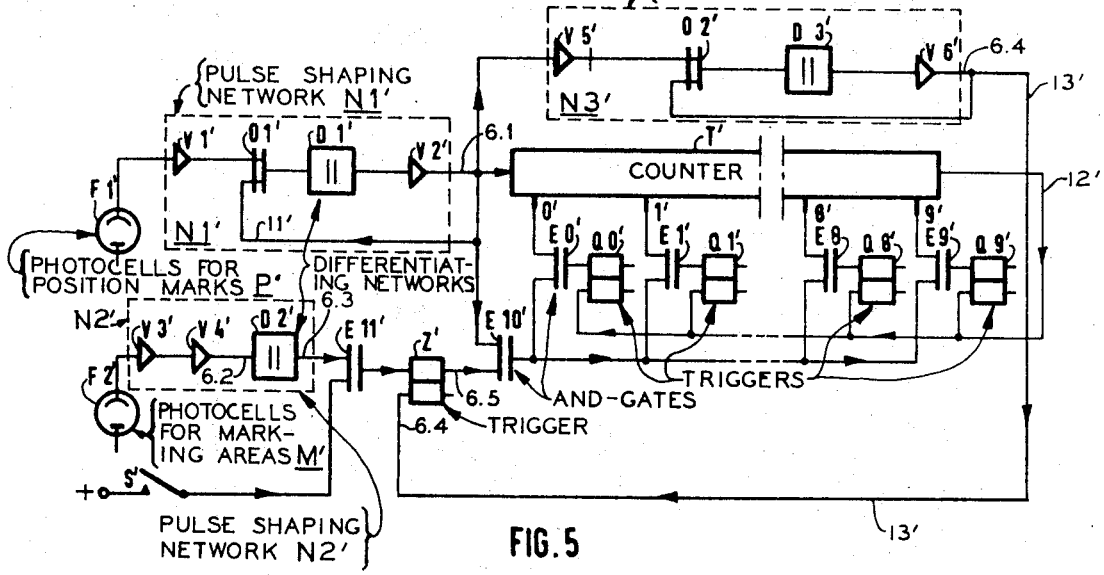
FIG. 5 is a schematic block wiring diagram of another embodiment of a reading-device which is adapted for reading the registration bearer as shown in FIG. 4.

(B-2) Reading device (FIG. 5)

FIG. 5 shows a schematic block wiring diagram of a reading device for the bearer R' in FIG. 4. In addition to the components shown in the diagram of FIG. 2, viz the four amplifiers V1' through V4', the OR-gate 01', the two differentiating circuits D1' and D2', the eleven AND-gates E0' through E10', the counter T' and the ten triggers Q0-Q9, the circuit of FIG. 5 also contains two more amplifiers V5' and V6', another OR-gate 02', another differentiating circuit D3', another AND-gate E11', another trigger Z', and a switch S', but it does not contain a delay circuit such as DC. (The circuits and parts thereof in FIG. 5 having similar functions to the circuits and parts thereof in FIG. 2 are given the same reference characters primed.)

Figure 6:
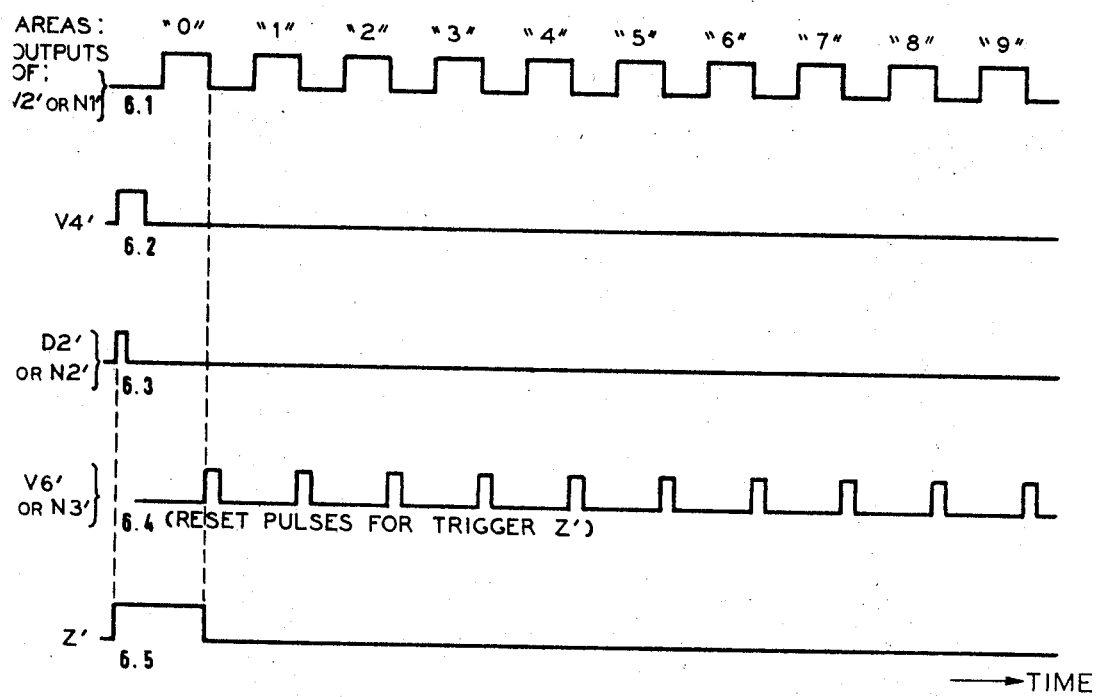
FIG. 6 represent a plurality of the wave forms of pulses according to time appearing at various points of the circuit of the reading-device shown in FIG. 5.

(B-3) Operation (a) *Position pulse shaping circuit.*—In this case similar to the circuit in FIG. 2, the photocell F1' scans the position marks P' and the pulses delivered by it are amplified by the amplifier V1'. These pulses thus amplified are applied directly to the rest of the pulse-shaping network N' consisting of the OR-gate 01', the differentiating circuit D1' and the amplifier V2'. The duration of the pulses appearing at the output terminal of the amplifier V2', or this pulse shaping network N1', also is determined by the time constant of the differentiating circuit D1' and it is so adjusted that the pulse ends at the moment when the photocell F2' crosses the imaginary tolerance line X'. Wave form 6.1 in FIG. 6 shows, as a function of time, the series of pulses appearing at the output terminal of the amplifier V2', or this pulse shaping network N1'. These pulses are applied to counter T' similarly to position the indicating pulses in the circuit of FIG. 2.

(B–3)–(b) Marking pulse shaping circuit

Now, if it is assumed that the marking-square "0" of the registration bearer R' has been marked or filled-in by the mark $m'$ whose upper limit coincides with the tolerance line W', it may happen that the pulse obtained by the scanning by the photocell $F_2'$ and its subsequent amplification by the amplifiers V3' and V4', has a shape as shown in wave form 6.2 of FIG. 6. The output terminal of the amplifier V4' is connected to the input terminal of the differentiating circuit D2', similarly to that shown and described in the network N2 of FIG. 2. Wave form 6.3 shows the pulse appearing at the output terminal of this circuit D2'.

Since this mark $m'$ indicating pulse of wave form 6.3 appears before the corresponding position indicating pulse appears at the output terminal of the amplifier $V_2'$, the trigger Z' has been inserted before the AND-gate E10'. This trigger Z' is connected via the AND-gate E11', which is not only connected to the output terminal of the differentiating circuit D2' or pulse shaping network N2', but also to the switch S', which is kept closed as long as a registration bearer R' is being scanned. This switch S' passes a positive potential to the AND-gate E11', so that this gate E11' lets pass any pulse, such as wave form 6.3 from circuit D2', that happens to appear, which passing pulse changes over the trigger Z'. Then as soon as the pulse of wave form 6.1 appears at the output terminal of the amplifier V2' or pulse shaping network N1', the trigger Q0' is changed over, in the manner similar to that described above for the circuit of FIG. 2, via the AND-gates E10' and E0'. Thus the voltage for the mark $m'$ occurring in the square 0, which appears at the output terminal of the trigger Z' and which is connected to the AND-gate E10', is shown in the wave form 6.5.

However, if the mark is placed in the lower part of the marking area or square, the pulse of the wave form 6.1 at the output terminal of the amplifier V2' or pulse shaping network N1' will appear first at AND-gate E10', and is of sufficient duration so that when trigger Z' changes over later, the trigger Q0' will change over also. This duration of the pulse wave form 6.1 for the time to scan the distance down the column of marking areas from the center line $c'$ to the lower tolerance line X' is described above in Section (B–3)–(a).

(B-2-(c) Resetting circuits

After the scanning of each marking area or square, the trigger Z' must be restored to normal. The required pulse is obtained by applying the output pulse of the amplifier V2' or pulse shaping network N1' to the inverting amplifier V5', the output terminal of which is connected to the rest of the third pulse shaping network N3' consisting of the OR-gate 02', the differentiating network D3 and the amplifier V6'. Now at the output terminal of this latter amplifier V6' there appears a positive pulse at the trailing edge of each pulse appearing at the output terminal of the amplifier V2' or pulse shaping network N1', i.e. the pulse of wave forms 6.4 in FIG. 6 appears at the moment when the photocell F2' crosses the lower tolerance line X' of a marking area or square M'. The duration of the pulses appearing at the output terminal of the amplifier V6' or network N3' is determined again by the time constant of the differentiating circuit D3' and this duration is so adjusted that such a pulse is present from the moment when the photocell F2' crosses the lower tolerance line X' of a marking-area or square M' to the moment when it crosses the upper tolerance line W' of the next marking-area or square M'. When these pulses or wave forms 6.4 are applied to the second input terminal of the trigger Z' via conductor 13', they will restore this trigger Z' to normal. Thus a pulse applied erroneously at the first input terminal in during the presence of the pulses in wave form 6.4 will have no effect on the trigger Z'.

At the end of the scanning of a column, the triggers Q0' through Q9' are restored to normal via conductor 12'.

In this embodiment also, two pulses resulting from the scanning of a cross-shaped mark in marking area M' will cause the change-over of only one trigger Q' because the trigger Z' can be changed over only once when a marking-area or square M' is scanned.

The device of FIG. 5 can be extended in a similar way as that of FIG. 2 in view of the scanning of registration bearers having more than one column of marking-squares or areas.

While I have illustrated and described what I regard to be the preferred embodiment of my invention, nevertheless it will be understood that such is merely exemplary and that numerous modifications and rearrangements may be made therein, without departing from the essence of the invention.

I claim:

1. A reading device for an information bearer (R) having:
   (a) at least one column (M) of areas to be marked, and
   (b) only one column of position marks (P) occcurring in the scanning directioon before and adjacent each of said areas of said one column,
said reading device comprising:
   (1) separate means (F1, F2) for photoelectrically scanning each of said columns for detecting marks to produce pulses therefrom,
   (2) means (N1) for shaping pulses from said position marks including differentiating circuit means (D1) and delaying means (DC) for extending the duration of said position mark pulses to coincide in duration to a predetermined duration corresponding to the duration for the scanning between upper and lower tolerance lines fixed thereby, and including a gate means (01) between said delaying means and said differentiating circuit means and a feedback circuit (11) from the output of said differentiating circuit means to a first input of said gate means and said delay means being connected to a second input of said gate means,
   (3) means (N2) for shaping including differentiating circuit means responsive to the leading edge only of the pulses from marks in said column of areas for shortening the duration of said pulses for said marks,
   (4) AND-gate means (E10) connected to the outputs of said pulse shaping circuits, and
   (5) means (T, Q0 through Q9) connected to said pulse shaping means for said position marks and to said AND-gate means for storing potentials corresponding to those areas on said bearer having marks with their upper limit between said tolerance lines.

2. A reading device according to claim 1 wherein said storing means comprises a counter circuit (T) for counting a number corresponding to the number of marking areas in said column.

3. A reading device according to claim 2 wherein said counter is a self-resetting counter after it counts a number corresponding to the number of marking areas in said column.

4. A device according to claim 2 wherein said storing means includes triggers (Q0 through Q9) operated by said pulse shaping means and said counting circuit.

means includes AND-gates (E0 through E9) at the input of each of said triggers.

5. A device according to claim 4 wherein said storing

6. A reading device for an information bearer (R') having:
   (a) at least one column (M') of areas to be marked, and
   (b) one column of position marks (P') opposite and adjacent each of said areas in said one column,
said reading device comprising:
   (1) separate means (F1', F2') for photoelectrically scanning each of said columns for detecting marks to produce pulses therefrom,
   (2) first means (N1') for shaping and extending the pulses from said position marks to coincide in duration to a predetermined duration corresponding to the duration for the scanning between the upper limit of a position mark and the lower tolerance line belonging to the adjacent area to be marked,
   (3) second means (N3'), connected to the output of said first pulse shaping means, for shaping and extending the trailing edge of the pulses from said first pulse shaping means to coincide in duration to a predetermined duration corresponding to the duration for the scanning between said lower tolerance line and the upper tolerance line belonging to the next area to be marked,
   (4) third means (N2') for shaping the leading edge of the pulses from marks in said areas,
   (5) trigger means (Z') connected to the outputs of said second and third pulse shaping means,
   (6) AND-gate means (E10') connected to the outputs of said trigger means and said first pulse shaping means to check the coincidence in time between a predetermined output of said trigger means and said pulses, and
   (7) means (T', Q0' through Q9') connected to said first pulse shaping means and said AND-gate means for storing potentials corresponding to those areas on said bearer having marks with the upper limit between said tolerance lines.

7. A reading device according to claim 6 wherein each of said pulse shaping means includes a differentiating circuit (D1', D2', D3').

8. A reading device according to claim 6 wherein said storing means comprises a counter circuit (T') for counting a number corresponding to the number of marking areas in said column.

9. A reading device according to claim 8 wherein said counter is a self-resetting counter after it counts a number corresponding to the number of marking areas in said column.

10. A device according to claim 8 wherein said storing means includes triggers (Q0' through Q9') operated by said pulse shaping means and said counting circuit.

11. A device according to claim 10 wherein said storing means includes AND-gates (E0' through E9') at the input of each of said triggers.

12. A reading device according to claim 6 wherein said first means for shaping and extending the pulses from said position marks includes a feedback circuit (11') for extending said pulses.

References Cited

UNITED STATES PATENTS

| 3,185,970 | 5/1965 | Cromleigh et al. | 340—174.1 |
| 2,994,853 | 8/1961 | Astrahan | 340—173 |
| 2,972,735 | 2/1961 | Fuller et al. | 340—174.1 |

MAYNARD R. WILBUR, Primary Examiner

R. F. GNUSE, Assistant Examiner

U.S. Cl. X.R.

235—61.11

(Our Ref. P 169/102.1)

PO-1050
(5/69)

UNITED STATES PATENT OFFICE
CERTIFICATE OF CORRECTION

Patent No. 3,528,059                    Dated Sept. 8, 1970

Inventor(s)  A. A. SPANJERSBERG

It is certified that error appears in the above-identified patent and that said Letters Patent are hereby corrected as shown below:

Column 3, line 49, "Fig. 2" should read -- Fig. 1 --. Column 4, line 46, "37" should read -- 3.7 --; line 56, "D1" should read -- N1 --. Column 5, line 59, "Q0 - Q9" should read -- Q0' through Q9' --. Column 6, line 71, after "pulses" insert -- in wave form 6.4 --. Column 7, line 7, cancel "in"; line 14, after "Q' " insert -- this time --; line 34, claim 1, "directioon" should read -- direction --.
Column 8, lines 1 through 3, should read
-- 5. A device according to claim 4 wherein said storing means includes AND-gates (E0 through E9) at the input of each of said triggers. -- .

SIGNED AND
SEALED
DEC 22 1970

(SEAL)
Attest:

Edward M. Fletcher, Jr.
Attesting Officer

WILLIAM E. SCHUYLER, JR.
Commissioner of Patents